Sept. 6, 1949. B. P. STRONG 2,481,364
GRASS CUTTING MACHINE
Filed Aug. 21, 1946 2 Sheets-Sheet 1

INVENTOR.
Basil P. Strong
BY
Freass and Bishop
ATTORNEYS

Sept. 6, 1949.          B. P. STRONG          2,481,364

GRASS CUTTING MACHINE

Filed Aug. 21, 1946          2 Sheets-Sheet 2

INVENTOR.

Basil P. Strong

BY

*Frease and Bishop*

ATTORNEYS

Patented Sept. 6, 1949

2,481,364

UNITED STATES PATENT OFFICE 2,481,364

GRASS CUTTING MACHINE

Basil P. Strong, Atwater, Ohio, assignor to Atwater-Strong Company, Atwater, Ohio, a corporation of Ohio Application August 21, 1946, Serial No. 691,971

5 Claims. (Cl. 56—292)

1

The invention relates generally to grass cutting or mowing machines, and more particularly to a mower having power driven cutting means.

The conventional lawn mower cuts a relatively narrow path through the grass, and if the cutting blades are lengthened to produce a wider path, the mower becomes increasingly difficult to push in a forward direction.

In addition to the conventional lawn mower, grass cutting devices have been proposed which mount a rotating blade or blades in a substantially horizontal plane near the ground. As such devices are moved forwardly over the ground, the grass cut by the blade at the front of the machine tends to pile up on the blade or on the driving means therefore and impede forward movement of the machine, especially if the grass is long or wet and heavy. Moreover, such prior devices are often expensive to construct and difficult to adjust.

It is an object of the present invention to provide a novel grass cutting machine which will cut a path through long or heavy grass without causing piling of the grass in such a manner as to impede forward progress of the machine.

Another object is to provide a novel grass cutting machine which is light in weight and inexpensive to build.

Another object is to provide a novel grass cutting machine which is easily adjusted over a relatively wide range for varying the height of the cut above the ground.

A further object is to provide a novel grass cutting machine which cuts a path of greatly increased width as it advances.

Another object is to provide a novel grass cutting machine which shreds or pulverizes the grass as it is cut so as not to require raking or removal of the cut grass.

Finally, it is an object of the present invention to provide a novel and improved grass cutting machine which is adapted to be used as a power or hand propelled mower.

These and other objects are accomplished by the parts, elements, constructions, arrangements and combinations which comprise the present invention, the nature of which is set forth in the following general statement, and a preferred embodiment of which is set forth in the following description and illustrated in the accompanying drawings, and which is particularly pointed out and set forth in the appended claims.

In general terms, the improved machine comprising the present invention may be stated as including a wheeled frame supporting a motor, which drives a transverse endless belt in a vertical plane in the front of the machine, and said belt carrying blades at intervals with their cutting edges disposed at right angles to the plane of the belt so that the lower run of the belt cuts a transverse strip of grass which progressively becomes a longitudinal path as the machine is moved forwardly.

Referring to the drawing forming part hereof, in which a preferred embodiment of the invention is shown by way of example:

Similar numerals refer to similar parts throughout the several views of the drawing.

Figure 1:
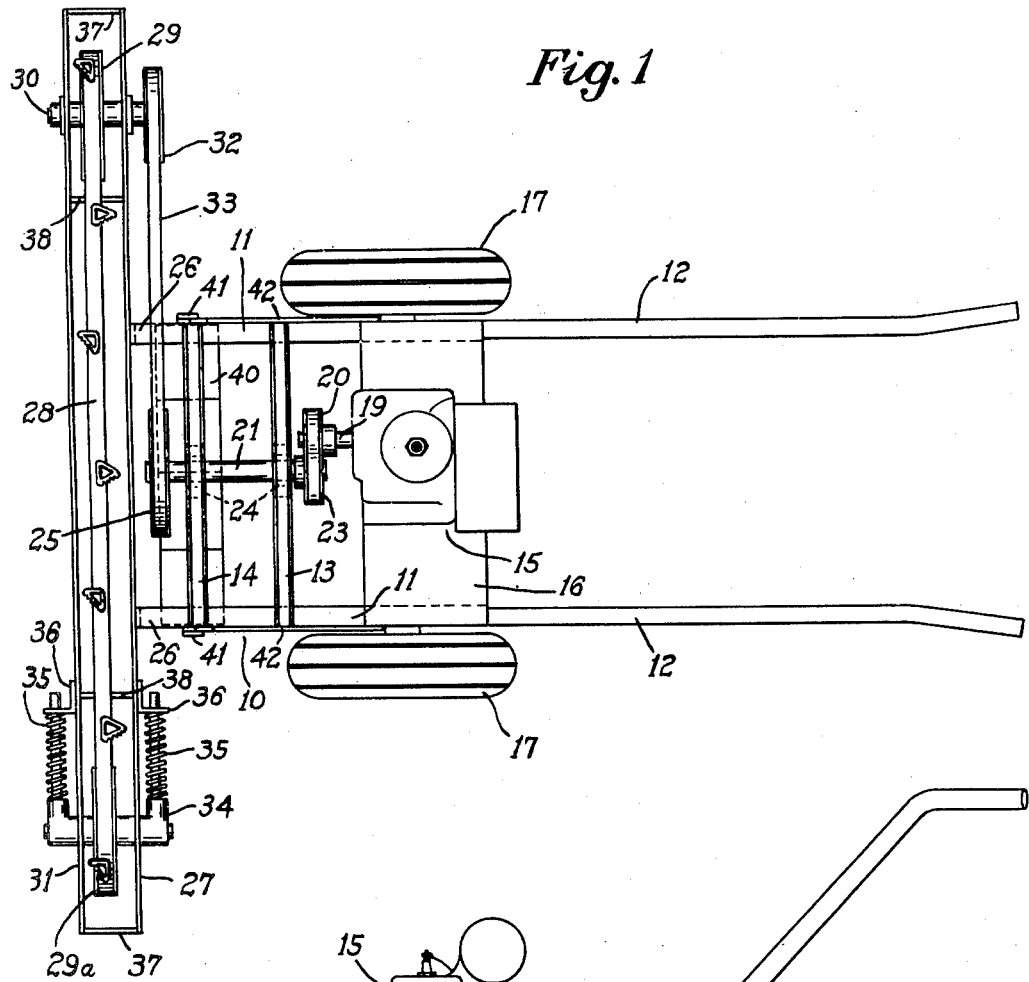
Figure 1 is a plan elevational view of the improved machine.
Figure 2:
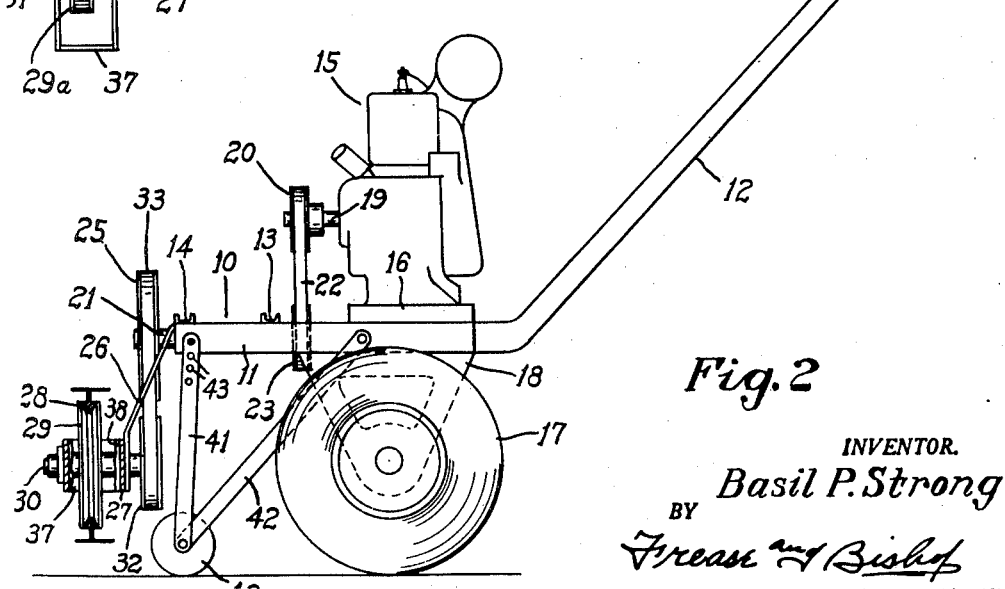
Fig. 2 is a side elevation thereof, partly in section.

In the preferred embodiment shown in the drawing of the grass cutting machine comprising the present invention, the machine is mounted on a rectangular frame indicated generally at 10 having side members 11 which may be steel angles, with a pair of handles 12 connected to their rear ends and extending angularly upward therefrom. Preferably a pair of spaced cross braces 14 and 13 are connected at their ends to the angles 11 at the front portions thereof, and the cross braces may be channels as shown.

A suitable engine or internal combustion motor indicated generally at 15 is mounted on a base 16 which is supported on the rear ends of the side frame members 11, as shown. Preferably a pair of wheels 17 is provided for rollably supporting the frame 10, and the wheels may be journaled in depending brackets 18 secured to the side angles 11 of the frame in a usual manner. If desired, the motor 15 may be operatively connected in a usual manner to the wheels 17 for driving the same.

The shaft 19 of the motor 15 is preferably provided with a pulley 20 for the purpose of transmitting power to a drive shaft 21, as by means of a belt 22 connecting the pulley 20 to a pulley 23 on the rear end of the drive shaft. The drive shaft 21 is preferably journaled in bearings 24 which are secured to the undersides of the cross braces 13 and 14, and a drive pulley 25 is fixed on the projecting front end of the drive shaft 21.

A pair of bars 26 are connected to the front ends of the frame angles 11 and depend angularly downward therefrom, their lower ends being connected as by riveting or welding to the rear transverse member 27 of a rectangular frame which surrounds the cutting belt 28 extending in a vertical plane transversely across the front of the machine. The belt 28 is trained around a pulley 29 within one end of the transverse frame, and around a similar pulley 29a within the other end thereof. The pulley 29 has a shaft 30 which is journaled in the rear and front members 27 and 31 respectively of the transverse frame, and the rear end of the shaft 30 has thereon a driven pulley 32 which is operatively connected to the drive pulley 25, preferably by means of a belt 33.

The other pulley 29a at the opposite end of the cutting belt 28 is journaled in a movable bearing support 34 which is yieldingly urged transversely outward to impose tension on the cutting belt. Preferably, the bearing 34 is urged outwardly by means of springs 35 interposed between the bearing and angle brackets 36 secured on the front and rear members 31 and 27 of the transverse rectangular frame. As indicated, the transverse members 31 and 27 of the frame are preferably connected by end pieces 37 and intermediate struts 38.

Figure 3:
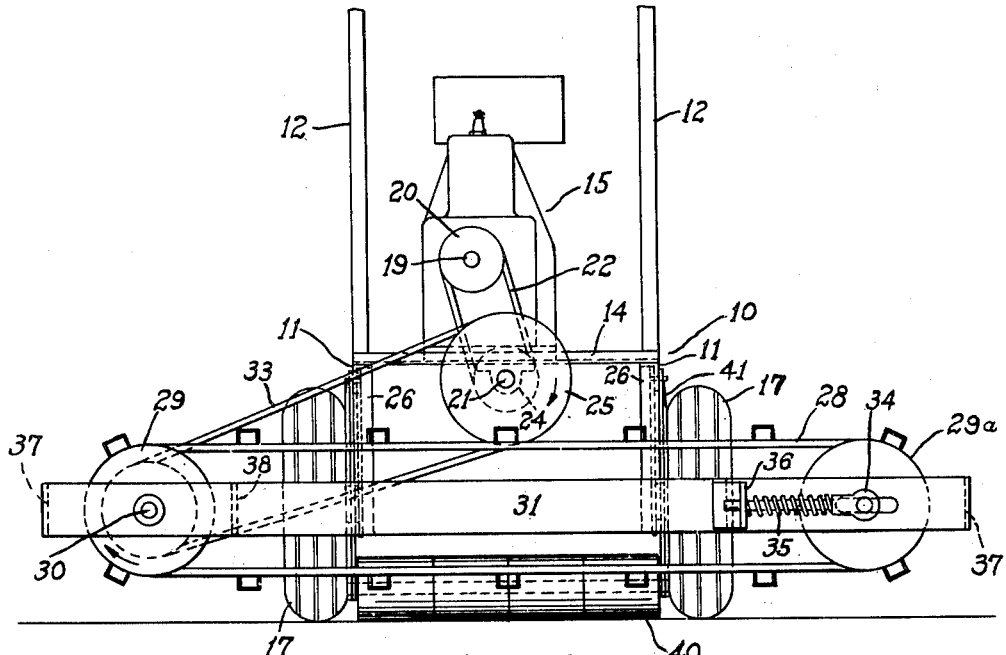
Fig. 3 is a front elevation thereof.

The front end of the frame 10 is preferably supported so as to maintain the cutting belt at a desired height by means of a roller 40 rolling over the ground. The roller 40 may be made in sections, as indicated in Figs. 1 and 3 so that if desired, the roller shaft may be extended and the sections spaced apart thereon to engage the ground at intervals over substantially the full length of the cutting belt. Preferably, the roller 40 is adjustably connected to the frame by means of a pair of bars 41 and 42 pivoted on each end of the roller shaft, each bar 42 being angled rearwardly and connected at its upper end to one side frame angle 11, and the upper end of the bar 41 being adjustably connected to the frame angle 11 at one of a series of holes 43 in the bar 41. By raising the connection of bar 41 with the frame member 11, the roller 40 will be raised, thus lowering the position of the cutting belt 28 with respect to the ground level.

Figure 4:
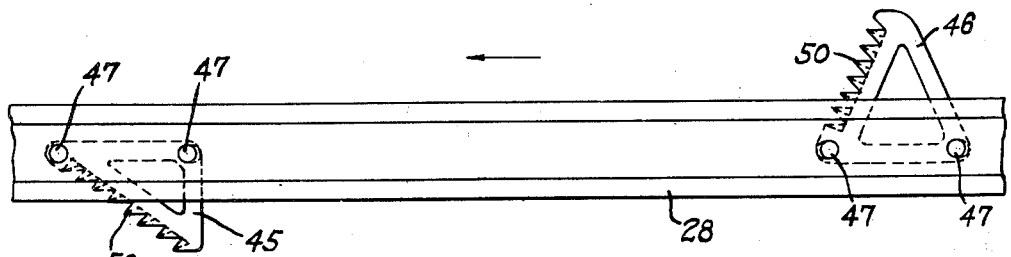
Fig. 4 is a fragmentary enlarged top plan view of the lower run of the belt.
Figures 5, 6:
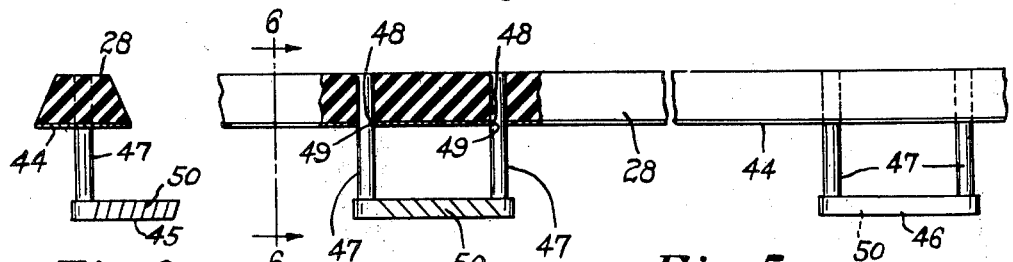
Fig. 5 is a side elevation thereof, partly in section.
Fig. 6 is a transverse section thereof, as on line 6—6, Fig. 5.

Referring particularly to Figs. 4, 5 and 6, the cutting belt 28 may be of V type as shown, and is preferably made of rubber composition or rubberized material. Preferably, the belt is reinforced by thin continuous metal strip 44 which may be vulcanized to the outer surface of the belt and extend continuously around the full periphery of the same. Obviously, such a continuous metal strip may be applied to the inner periphery of the belt without departing from the scope of the invention.

The cutting blades are secured at intervals along the belt 28 and the blades consist preferably of flat triangular blades 45 and 46 disposed at right angles to the plane of the belt as a whole and spaced outwardly thereof. The blades 45 project forwardly of the plane of the belt and alternate with the blades 46 which project rearwardly of the belt. Each of the blades 45 and 46 may be supported on and in parallel relation to the outer circumference of a run of the belt by means of a pair of posts or bars 47 which are received in vertical holes formed in the central portion of the belt 28, and the posts may be detachably anchored in the belt by means of notches 48 in the posts which engage the edges of holes 49 in the metal reinforcing strip 44. The posts 47 may be made slightly resilient so that they may be sprung sufficiently to snap the notches into engagement with the metal strip 44, and the notches in the forward posts 47 are preferably at the rear of the posts with respect to the direction of travel of the lower run of the belt so that the thrust of the cutting action will tend to hold said notches in engagement with the metal strip 44.

As shown, the forward cutting edge of each of the blades 45 and 46 is beveled downwardly inward and provided with teeth or serrations extending rearwardly at an angle to the belt as indicated at 50. The blades 45 project forwardly of the belt 28 a lesser amount than the blades 46 project rearwardly, because the blades 45 take the bulk of the cutting action as the machine is moved forwardly into the path of the grass, and the blades 46 merely follow up or even up the grass previously cut by the blades 45.

A suitable guard may be provided to cover the blades 45 and 46 if desired and a deflector may be mounted on the front of the transverse frame 27, 31 to guide the grass into the path of the cutter blades, if desired.

Accordingly, the novel and improved machine provides for cutting a path having a width equal to the horizontal run of the cutting belt as the machine is moved forwardly through grass and the like, such width being greatly increased as compared with the width of the path cut by a conventional mower. Moreover, the blades are individually replaceable when they become dull.

Due to the fact that the blades cut horizontally at right angles to the vertical plane of the cutting belt, the cut grass does not pile up in front of the machine as it moves forwardly. Instead the lower run of the belt and its cutters moves under the cut grass, regardless of how long or wet and heavy the grass is.

The serrated cutting edges of the blades 45 and 46 cause grinding and pulverizing of the grass as the belt travels therethrough at high speed, with the result that the pulverized grass is scattered over the ground and acts as a beneficial mulch, thus eliminating the need for raking or removal of the cut grass.

The improved machine is simple and inexpensive to construct, and lightweight and efficient in operation.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful methods and constructions, and reasonable mechanical equivalents thereof obvious to those skilled in the art, are set forth in the appended claims.

I claim:

1. In a grass cutting machine including a frame, wheels supporting the frame for moving it over the ground, a motor supported on said frame, an endless belt journaled on the frame for movement in a vertical plane transversely of the frame as the frame is moved forwardly, and means operatively connecting the belt to said motor, a blade mounted on supporting members spaced radially outwardly from the belt perpendicular to a plane running through the upper and lower runs of the belt for cutting below the lower run of the belt, said blade having a cutting edge extending laterally beyond the edge of the belt.

2. In a grass cutting machine including a frame, wheels supporting the frame for moving it over the ground, a motor supported on said frame, an endless belt journaled on the frame for movement in a vertical plane transversely of the frame as the frame is moved forwardly, and means operatively connecting the belt to said motor, a series of blades removably mounted on supporting members at intervals along and spaced radially outwardly from the belt for cutting below the lower run of the belt, each blade being perpendicular to a plane running through the upper and lower runs of the belt and having a serrated cutting edge extending laterally beyond the edge thereof.

3. In a grass cutting machine including a frame, wheels supporting the frame for moving it over the ground, a motor supported on said frame, an endless belt journaled on the frame for movement in a vertical plane transversely of the frame as the frame is moved forwardly, and means operatively connecting the belt to said motor, a blade mounted on supporting members spaced radially outwardly from the belt and having a cutting edge for cutting below the lower run of the belt, said blade being perpendicular to a plane running through the upper and lower runs of the belt, and means for adjusting the height of the blades above the ground.

4. A grass cutting machine including a frame, wheels supporting the frame for moving it over the ground, a motor supported on said frame, an endless belt journaled on the frame for movement in a vertical plane transversely of the frame as the frame is moved forwardly, means operatively connecting the belt to said motor, yielding means for maintaining tension on the belt, and a blade mounted on supporting members spaced radially outwardly from the belt for cutting below the lower run of the belt, said blade being perpendicular to a plane running through the upper and lower runs of the belt and having the leading edge rearwardly inclined relative to the direction of movement of the belt.

5. A grass cutting machine including a frame, wheels supporting the frame for moving it over the ground, a motor supported on said frame, transversely spaced vertical pulleys journaled on the frame, and an endless belt trained around said pulleys, means operatively connecting the motor to one of said pulleys for driving the belt, means yieldingly urging the other pulley transversely to impose tension on the belt, and a series of blades mounted at intervals along the belt on supporting members spaced radially outwardly thereof, each blade being perpendicular to a plane running through the upper and lower runs of the belt and having a serrated cutting edge rearwardly angled to the belt.

BASIL P. STRONG.

REFERENCES CITED

The following references are of record in the file of this patent:

UNITED STATES PATENTS

| Number | Name | Date |
| --- | --- | --- |
| 274,239 | Whitcomb | Mar. 20, 1883 |
| 591,606 | Martin | Oct. 12, 1897 |
| 1,364,251 | Cook | Jan. 4, 1921 |
| 1,760,939 | Emerson | June 3, 1930 |